(12) United States Patent
Griffitts

(10) Patent No.: US 6,703,805 B2
(45) Date of Patent: Mar. 9, 2004

(54) SYSTEM FOR MEASURING THE POSITION OF AN ELECTRIC MOTOR

(75) Inventor: Jonathan C. Griffitts, Boulder, CO (US)

(73) Assignee: Mountain Engineering II, Inc., Longmont, CO (US)

( * ) Notice: Subject to any disclaimer, the term of this patent is extended or adjusted under 35 U.S.C. 154(b) by 8 days.

(21) Appl. No.: 10/121,327

(22) Filed: Apr. 12, 2002

(65) Prior Publication Data

US 2003/0193306 A1 Oct. 16, 2003

(51) Int. Cl.[7] ................................................. H02P 3/00
(52) U.S. Cl. ..................... 318/459; 318/500; 318/254; 318/138; 318/439; 388/907.2; 388/928.1; 324/207.13; 324/207.19
(58) Field of Search ................................. 318/500, 254, 318/138, 439, 459; 388/907.2, 910, 928.1; 324/207.11, 207.13, 207.19

(56) References Cited

U.S. PATENT DOCUMENTS

| | | | |
|---|---|---|---|
| 3,931,553 A | | 1/1976 | Stich et al. |
| 4,005,347 A | | 1/1977 | Erdman |
| 4,027,212 A | | 5/1977 | Studer |
| 4,092,572 A | | 5/1978 | Murata |
| 4,229,682 A | * | 10/1980 | Goddijn ..................... 318/254 |
| 4,492,902 A | * | 1/1985 | Ficken et al. ............... 318/254 |
| 4,495,450 A | | 1/1985 | Tokizaki et al. |
| 4,654,566 A | | 3/1987 | Erdman |
| 4,746,844 A | | 5/1988 | MacKelvie et al. |
| 4,758,768 A | | 7/1988 | Hendricks et al. |
| 4,882,524 A | | 11/1989 | Lee |
| 5,191,270 A | | 3/1993 | McCormack |
| 5,192,900 A | | 3/1993 | Ueki |
| 5,194,787 A | * | 3/1993 | Antognini .................. 318/254 |
| 5,304,902 A | | 4/1994 | Ueki |
| 5,327,053 A | | 7/1994 | Mann et al. |
| 5,350,987 A | | 9/1994 | Ueki |
| 5,481,166 A | * | 1/1996 | Moreira ..................... 318/254 |
| 5,739,652 A | * | 4/1998 | Sriram ....................... 318/439 |
| 5,751,125 A | | 5/1998 | Weiss |
| 5,821,713 A | | 10/1998 | Holling et al. |
| 5,864,217 A | | 1/1999 | Lyons et al. |
| 5,990,642 A | | 11/1999 | Park |
| 6,169,354 B1 | | 1/2001 | Springer et al. |
| 6,246,193 B1 | * | 6/2001 | Dister ....................... 318/254 |
| 6,288,514 B1 | | 9/2001 | Direnzo et al. |
| 6,304,045 B1 | | 10/2001 | Muszynski |

OTHER PUBLICATIONS

Matsui, Nobuyuki, IEEE, "Brushless dc Motor Control without Position and Speed Sensors", 1992, pp. 120–127.

(List continued on next page.)

Primary Examiner—Rina I. Duda
(74) Attorney, Agent, or Firm—Rick Martin; Patent Law Offices of Rick Martin, P.C.

(57) ABSTRACT

An electric system utilizes dynamic impedance changes in windings of an electric motor to measure/monitor mechanical position. The method employs a bridge amplifier to measure voltage at a center node or windings against a voltage derived from a reference network. When a winding of the motor is driven, the winding forms a voltage divider across the center node. Impedance changes in windings occur as rotor poles pass by stator poles. The center node voltage varies with these impedance changes in legs on either side; this variation with respect to the reference network corresponds to measurement of rotational position. These measurements provide position/velocity feedback to a servo controller as long as current runs through a winding. This position sensing also applies to controlling commutation for brushless DC motor. Impedance measurement use normal motor-drive current for excitation without additional sensing signals, extra "sense" windings, or external sensors.

28 Claims, 12 Drawing Sheets

OTHER PUBLICATIONS

Ehsani, Mehrdad, et al., IEEE, "New Modulation Encoding Techniques for Indirect Rotor Position Sensing in Switched Reluctance Motors", Jan./Feb. 1994, pp. 85–91.

Schmidt, Peter B. et al. IEEE, "Initial Rotor Angle Detection of a Non–Salient Pole Permanent Magnet Synchronous Machine", Oct. 1997.

Johnson, James P. et al., IEEE, "Review of Sensorless Methods for Brushless DC", 1999, pp. 143–150.

Johnson, James P. et al., IEEE, "Sensorless Brushless DC Control Using A Current Waveform Anomaly", 1999, pp. 151–158.

Bu, Jianrong, IEEE, "Eliminating Starting Hesitation for Reliable Sensorless Control of Switched Reluctance Motors", 2001, pp. 59–66.

* cited by examiner

30

SYSTEM FOR MEASURING THE POSITION OF AN ELECTRIC MOTOR

FIELD OF THE INVENTION

This invention relates to electronic monitoring of electric motor position by utilizing a bridge amplifier circuit to measure the ratio of impedances between two motor windings, or legs of a single winding. The measurements made can control commutation or provide position and velocity feedback to a control system.

REFERENCES CITED

U.S. Patent Documents

U.S. Pat. No. 3,931,553 (January/1976) to Stich et al.
U.S. Pat. No. 4,005,347 (January/1977) to Erdman
U.S. Pat. No. 4,027,212 (May/1977) to Studer
U.S. Pat. No. 4,092,572 (May/1978) to Murata
U.S. Pat. No. 4,495,450 (January/1985) to Tokizaki et al.
U.S. Pat. No. 4,654,566 (March/1987) to Erdman
U.S. Pat. No. 4,746,844 (May/1988) to MacKelvie et al.
U.S. Pat. No. 4,758,768 (July/1988) to Hendricks et al.
U.S. Pat. No. 4,882,524 (November/1989) to Lee
U.S. Pat. No. 5,191,270 (March/1993) to McCormack
U.S. Pat. No. 5,192,900 (March/1993) to Ueki
U.S. Pat. No. 5,304,902 (April/1994) to Ueki
U.S. Pat. No. 5,327,053 (July/1994) to Mann et al.
U.S. Pat. No. 5,350,987 (September/1994) to Ueki
U.S. Pat. No. 5,751,125 (May/1998) to Weiss
U.S. Pat. No. 5,821,713 (October/1998) to Holling et al.
U.S. Pat. No. 5,864,217 (January/1999) to Lyons et al.
U.S. Pat. No. 5,990,642 (November/1999) to Park
U.S. Pat. No. 6,169,354 (February/2001) to Springer et al.
U.S. Pat. No. 6,288,514 (September/2001) to Direnzo et al.
U.S. Pat. No. 6,304,045 (October/2001) to Muszynski

Other Publications

Conference Record of the IEEE Industry Applications Meeting (1999, p. 143), "Review of Sensorless Methods for Brushless DC"

IEEE Transactions on Industry Applications, Volume 28 Issue 1, (January/February 1992. p. 120), "Brushless DC motor control without position and speed sensors"

IEEE Transactions on Industry Applications, Volume 30 Issue 1, (p 85, January/February 1994, p. 85), "New modulation encoding techniques for indirect rotor position sensing in switched reluctance motors"

Design News, (Apr. 8, 1991), "Brushless DC Motors Yield Design Payoffs"

Conference Record of the IEEE Industry Applications Meeting (1990, p. 443), "An approach to Position Sensorless Drive for Brushless DC Motors"

IEEE Transactions on Industry Applications, V37 Issue 1, "Eliminating Starting Hesitation for Reliable Sensorless Control of Switched Reluctance Motors"

Conference Record of the IEEE Industry Applications Meeting (1999, p 151), "Sensorless Brushless DC Control Using A Current Waveform Anomaly"

Conference Record of the IEEE Industry Applications Meeting (1997), "Initial Rotor Angle Detection of a Non-Salient Pole Permanent Magnet Synchronous Machine"

BACKGROUND OF THE INVENTION

Many types of electrical motors are known. All electrical motors have a stator and a moving component. In rotary motors the moving component is called a "rotor". In linear motors the moving component is typically called a "slider". This invention applies to all electrical DC motors, including linear motors. For simplicity, the term "rotor" is used here to refer to the moving component of all motors, and it is understood that the term "rotor" also comprises "sliders".

FIG. 1 illustrates one type of electric motor. At the center of the motor is the rotor 1 which is the moving part of the motor. The rotor contains eight permanent magnets 2 arranged as shown so that a sequence of alternating North and South magnetic poles are exposed along the outer rim. In this drawing the rotor is shown to be rotating in a counterclockwise direction.

Surrounding the rotor is the stator 3, which is stationary. The stator is made up of twelve electromagnets 4, divided up into three phases A, B, and C. All four electromagnets of phase A are driven together by the same electrical signal, and likewise for phases B and C. The apparatus to drive the three phases of electrical current is outside the motor and not shown in FIG. 1. This example motor would be termed a three-phase, eight-pole, brushless DC motor.

The principle of operation of the motor is shown in FIG. 1a, which is an expanded view of the bottom right quadrant of FIG. 1. The other three quadrants work identically to the one shown and are omitted from the drawing for clarity. At the moment shown, phase A is "off" (not being driven with current), thus phase A winding has no magnetic field around it. Phase B is driven with current such that a magnetic North pole is induced on the side next to the rotor. Similarly, phase C is driven in series with B to induce a South pole next to the rotor.

Two of the rotor magnets 5, 6 are shown. At this moment, rotor magnet 5 is positioned between the phase B electromagnet and the phase C electromagnet. The South pole on the phase C electromagnet attracts the North pole on magnet 5, while the North pole on the phase B electromagnet repels North pole on magnet 5. These magnetic forces both act to push magnet 5 to the right, thereby imparting counterclockwise torque to the rotor. This force makes the motor rotate. At this time, rotor magnet 6 is positioned near the phase A electromagnet that is switched off, so there is little or no magnetic force on magnet 6.

As the rotor moves counterclockwise, the magnet 5 moves to the right until it reaches a position adjacent to electromagnet C, where the magnetic forces from windings B and C are no longer effective to push it along. To maintain motor torque at this rotor position, the pattern of currents through the phase electromagnets must be changed. Phase C will then be switched off, and phase A will be driven such that it generates a South pole next to the rotor. At this time, rotor magnet 6 is positioned between electromagnet A and B so magnet 6 is subject to forces pushing it to the right, similarly to the situation with magnet 5 earlier. Since magnet 5 is now next to phase electromagnet C and phase C is switched off, there will be no effective force on magnet 5 in this position.

As the rotor moves still further, a new rotor magnet will move into this quadrant, this one with a North pole exposed at the rim. Following that, another magnet with a South pole will move in. After 90 degrees of rotation, the situation will again appear the same as it did at the start, with a South pole on the rotor adjacent to phase winding A. During this 90 degree rotation, the phase currents will have been switched six times to keep the magnetic field applied appropriately for the rotor magnet positions. This sequence of six states is termed "360 electrical degrees" and is repeated for each pole pair, so we see that for an eight-pole motor, 360 electrical degrees correspond to 90 mechanical degrees of rotation. The process of switching phases to correspond to rotor position is called "commutation".

FIG. 1b illustrates the commutation sequence for the above example, showing the correspondence of rotor position to phase winding state. Phase A begins in the "off" position and phase B is not being driven, as described previously. The sequence of driving phase A, B, C is depicted showing the magnetic poles induced (North or South). The movement of the rotor is also shown relative to the phase A starting position.

The commutation process described above is a simple switching process sometimes called "trapezoidal drive" of a motor. It is sometimes desirable to use a more complex driving method where the motor windings are driven with an arbitrary analog waveform such as a sinusoid, rather than simply being switched on and off. This is often termed "sinusoidal drive".

The example motor in FIGS. 1, 1a represents one common configuration for a rotary motor. Many other configurations are in common use. For example, the rotor magnets may be made up of electromagnets instead of permanent magnets; in this case the stator may or may not use permanent magnets. Other possible configurations include having the stationary stator inside the rotor or alongside it in the axial direction. The disclosed invention can be applied in all these configurations.

FIG. 1c illustrates an example of a linear motor. It has a three-phase stator 8 made up of windings, which surround the slider 7. Operation of this linear motor is very similar to that of the rotary motor just described. The three stator phases A, B, and C correspond to the phases in the rotary motor's stator, and the permanent magnet poles in the slider correspond to the rotor magnets. The number of stator windings and rotor poles is arbitrary, and depends on the needed physical length of travel.

As with the rotary motor, linear motors can have many other configurations, and the disclosed invention is applicable to all.

The examples illustrated above (FIGS. 1, 1a, 1b, 1c) describe one method of commutation. There are different schemes for driving electric motors, but they all share the common concept of controlling the electromagnet drive currents to generate a moving magnetic field that is synchronized to the rotor position. Accordingly, the mechanical position of the rotor relative to the stator must be known by the driving apparatus in order to provide proper control of the windings. Many types of position sensing apparatus have been used with electric motors The simplest form of position sensing in DC motors is the brush commutator. The brush commutator is still extensively used but suffers from some disadvantages as a result of friction and wear between the brushes and the commutator surfaces, and consequential reliability and maintenance problems are the result.

Brushless DC motors avoid these problems by performing commutation electronically. Electronic commutation has traditionally required the use of external position sensors mounted on the motor. The most common of these sensors are Hall-effect magnetic sensors mounted near the rotor. This technique is described in many places (i.e. ref. U.S. Pat. Nos. 4,092,572 and 4,758,768). If greater angular resolution and accuracy is needed, an optical shaft encoder is sometimes used in addition to, or instead of, Hall-effect sensors. Use of an optical encoder for commutation is described in ref. U.S. Pat. Nos. 4,005,347 and 4,882,524. Another standard sensor technology is a magnetic resolver. Other types of external sensors have also been used or suggested. ref. U.S. Pat. No. 3,931,553 describes the use of a capacitative rotation sensor for commutation control; ref. U.S. Pat. No. 5,864,217 describes use of a toothed wheel and magnetic pickup sensor; and ref. U.S. Pat. No. 4,027,212 describes techniques for motor commutation controlled by external rotation sensors in general.

Motor position sensing can also be done with extra windings built into the motor instead of using external sensors. Several approaches have been suggested; one example is described in ref. U.S. Pat. No. 6,169,354.

All of the above methods add extra cost to the system and take up extra space in or near the motor. In addition, some of the aforementioned methods have accuracy and reliability issues. To avoid these liabilities, many ideas have been previously pursued in order to find ways of eliminating extra position sensing components.

The most common approach for sensorless control of rotary motors is to sense the motor rotation by monitoring of the induced voltage in the motor windings caused by the rotating magnetic field of the rotor. This voltage waveform (termed back-EMF) is usually monitored in a motor winding leg that is not being driven; the winding used for voltage waveform monitoring shifts as the motor commutation rotates between the windings.

FIG. 2 depicts three motor windings 10, 11, 12 of a typical 3-phase motor. Windings 10, 11, 12 are connected at center node 13. A current through two of the three windings drives the motor. At any given time, two of the windings are driven in this way and the third remains idle. The example depicted in FIG. 2 shows current being sent through windings 10, 12 in the direction of arrows A and B. The third winding 11 is idle (or un-driven). Differential amplifier 20 measures the induced voltage across idle winding 11 and generates output signal 21. Output signal 21 is thus a measurement of the induced voltage across idle winding 11, and is dependent on both the speed and position of the rotor. As the motor moves, commutation causes the drive windings to be switched, and the sense winding must also be switched correspondingly.

A major disadvantage is that this method works only when the rotor is rotating at a reasonable speed, since there is no induced voltage from a stationary magnetic field. Some special technique must thus be used to get rotation started. This is acceptable in some applications such as fans and disk drives that use a constant motor rotational speed when operating, but it is unacceptable for many other applications such as robotics and tape drive applications where the motor must remain under close control when being held in a stationary position. Back-EMF sensing is commonly employed in many applications where these drawbacks are acceptable. Variations on this concept are well known in the present art. They are described in many places including the reference U.S. Pat. Nos. 6,304,045, 4,495,450, 4,654,566, and 4,746,844, and also in many published articles.

Several methods of rotor position-sensing have also been suggested that involve adding position-sensing windings to a motor (ref. U.S. Pat. No. 6,169,354). However these methods also add undesirable cost and complexity to the motor.

Some research and experimentation has been done with other sensorless motor drive techniques that use measurement of impedance variations in the windings to derive the motor mechanical position. These impedance changes take place as the magnetic poles of the rotor pass by the poles of the stator. Generally these methods involve inducing a test signal into the motor in addition to the actual motor drive currents, and measuring the high-frequency response. These signals may be pulses, as disclosed in. ref. U.S. Pat. No. 6,288,514, or the signals may be continuous AC signals, as discussed in ref. U.S. Pat. No. 5,990,642.

Several other proposed sensorless methods use dynamic measurements of winding current and applied voltage to derive mechanical position of the motor. The motor commutation is driven based on an estimated/extrapolated motor position, and the measured voltage and current parameters are used to correct the estimate through one of a variety of mathematical techniques including fundamental machine equations, dynamic models, and "observers". An "observer" in this context could also be called a "state observer", and refers to specific mathematical technique(s) that consist of a mechanism (usually implemented in software) that monitors parameters of the system in operation (i.e. motor and motor-controller) and derives information that can't be directly measured.

Ref. U.S. Pat. No. 5,751,125 describes a more novel position-sensing scheme as part of an artificial heart mechanism. It derives motor position from measurements of the inductance ratio between adjacent windings in a delta-connected motor. The winding inductances vary with motor rotation. As one winding of the delta circuit is driven, the other two un-driven windings form a voltage divider, and the voltage of the un-driven node changes with the variations in the winding inductances in that voltage divider. In this ref. patent, the position sensing is used only to control commutation; no velocity or high-resolution position measurements are needed for this application.

The ref. U.S. Pat. Nos. 5,304,902 and 5,192,900 describe a circuit configuration somewhat similar to the aforementioned artificial heart mechanism, controlling commutation based on voltage measurements at an un-driven leg or at the center node of a Wye-connected motor. However both of these patents focus on the voltages from back-EMF rather than from inductance variations.

Many papers and articles have been published exploring different methods for sensorless motor control. A useful summary was presented at the 1999 *IEEE Industry Applications Meeting* (1999), titled "Review of Sensorless Methods for Brushless DC".

What is needed is a sensing mechanism for motor position control which does not require external sensors, and which reduces cost and improves reliability. The present invention addresses these needs and provides for measurement verification using standard methods which are known.

SUMMARY OF THE INVENTION

The main aspect of the present invention is to provide a motor position sensing mechanism for DC motors that does not require external sensors to be attached to the DC motor.

Another aspect of the present invention is to provide for a motor position sensing mechanism that does not inject any extra signals or currents into the motor mechanism.

Another aspect of the present invention is to provide good speed and positional feedback to the controlling circuitry.

Another aspect of the present invention is to insure good position control for the motor mechanism, even when the motor is stopped, idle or actively maintaining its position via a controlling servo.

Another aspect of the present invention is to insure that the motor positional control functions under any condition from stalled to unloaded.

Another aspect of the present invention is to employ a bridge amplifier circuit to measure the ratio of impedance between the two motor windings as these windings move in relation to a fixed magnet.

Another aspect of the present invention is to employ sensing means functioning to measure and verify a motor position and/or speed measurement sensed by the present invention.

Other aspects of this invention will appear from the following description and appended claims, reference being made to the accompanying drawings forming a part of this specification wherein like reference characters designate corresponding parts in the several views.

The present invention employs a bridge amplifier circuit to measure the ratio of impedances between two motor windings, or two legs of a single winding. The present invention utilizes dynamic changes in that impedance measurement to accurately track the position of the motor.

The present invention provides a circuit and method for position sensing of DC motors without requiring external sensors to be attached to the motor. The present invention does not inject extraneous signals or currents into the motor for position detection. Position sensing must be accurate enough to provide good control for motor commutation, and must provide good speed and position feedback for a servo controller. Furthermore, position sensing must work even when the motor is stopped in either an idle mode or actively maintaining its position via a position servo. Position sensing of the present invention must work under any motor-loading condition from stalled to unloaded and free-running.

The present invention employs the use of a novel circuit to perform a winding impedance measurement that avoids many of the aforementioned problems that were discussed concerning the earlier sensorless schemes.

The key feature of the present invention is that it uses a bridge amplifier circuit to measure the ratio of impedances between two motor windings, or two legs of a single winding, rather than attempt to make an accurate absolute impedance measurement.

U.S. Pat. No. 5,751,125 measures the inductance ratio between two windings, but it uses an absolute voltage measurement instead of a bridge amplifier. An absolute voltage measurement or a measurement against a fixed reference voltage will be very sensitive to a number of secondary effects that will cause serious measurement errors. Changes in temperature, fluctuations of the supply voltage, and changes in other parameters influence the measurement. Bridge amplifiers using a reference network are used to measure impedances in some sensors such as strain gauges, to compensate for similar errors. Bridge amplifier techniques can also be applied to the motor winding impedance-sensing problem. The use of such conventional methods in conjunction with the winding impedance measurement of the present invention provides means for verifing the motor positioning sensed by the present invention.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF INVENTION AND DRAWINGS

Figure 3:
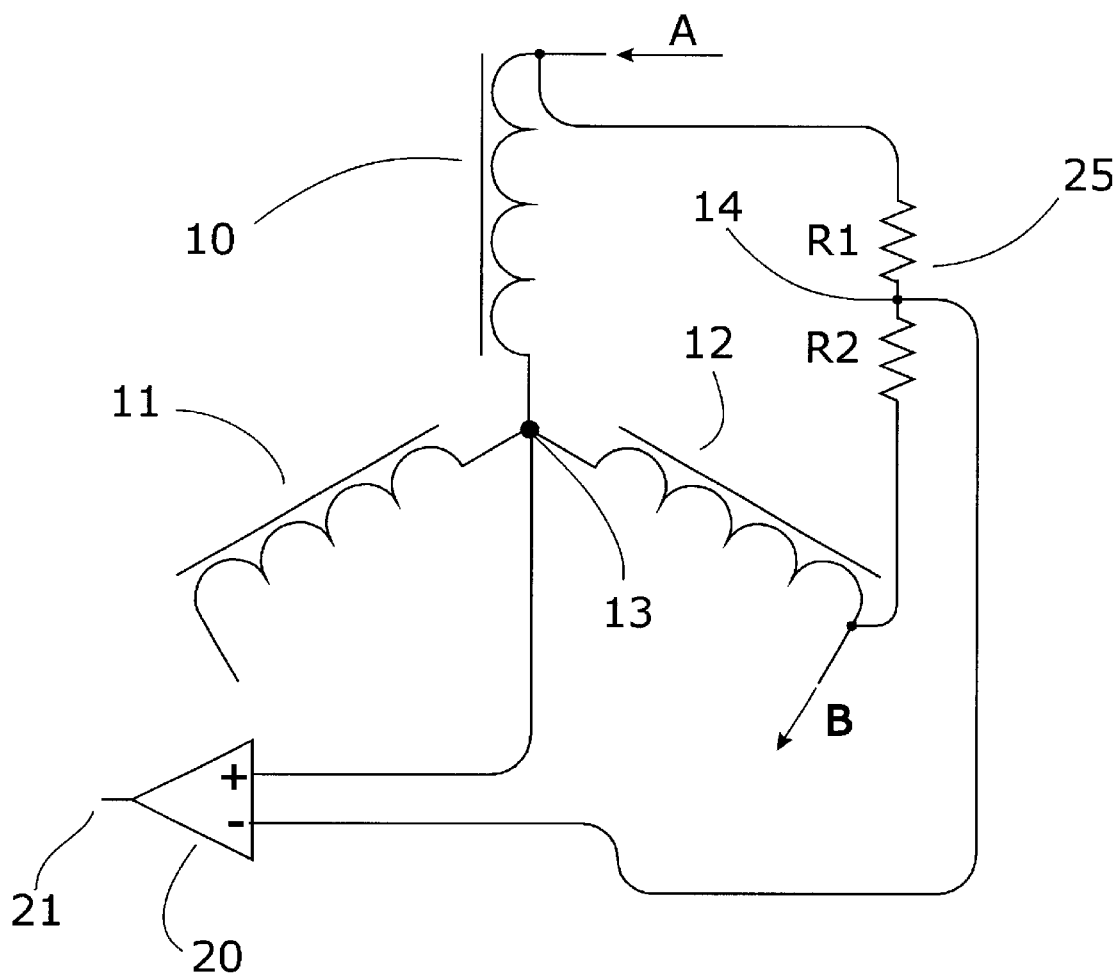
FIG. 3 is a schematic diagram of the motor and sensing circuit of the preferred embodiment of the present invention.

FIG. 3 is a schematic diagram of the motor and sensing circuit of the present invention showing bridge amplifier 20 and circuit connections. At the moment shown, windings 10 and 12 are being driven in series. A voltage at center node 13 of typical wye-connected motor windings 10, 11, 12 is measured by differential amplifier 20, using, as reference, the voltage of center node 14 of a fixed-impedance reference network 25 that is connected in parallel with driven motor windings 10, 12, as shown. Fixed-impedance reference network 25 and the motor windings 10, 12 form a classic "Wheatstone Bridge" configuration. FIG. 3b illustrates the details of the bridge amplifier. The reference network of fixed impedances Z1 and Z2 is connected in parallel to the driven motor phase windings variable impedances ZV1 and ZV2. Variable impedances ZV1 and ZV2 are the impedances from windings depicted as 10 and 12 and driven at nodes A and B in FIG. 3. Impedance changes in the motor windings will cause changes in the voltage at motor center node 13 which can be detected by subtracting the reference network voltage 14 from the motor center node voltage 13; this is the function of differential amplifier 20. Variations in the drive voltage and current will also cause spurious changes at center node 13 voltage, but these factors will also cause corresponding changes in the reference voltage 14, so differential amplifier 20 will not respond to them and the spurious signals will not appear in output signal 21.

It should be noted that the inductance component of the variable impedances ZV1 and ZV2 will only react to the high-frequency AC component of their drive signal. The low-frequency component of the drive signal is always present for the motor to generate torque, but it will generate a good output only for the resistance component of ZV1 and ZV2. While both inductance and resistance of the motor windings can vary depending on motor position, the inductance changes are often more important. In most systems, the motor drive signal is Pulse-Width Modulated (PWM) by the driver circuit, and a PWM signal contains a strong AC component at moderately high frequency. This AC component allows the bridge amplifier to detect changes in inductance of the windings.

Figure 3A:
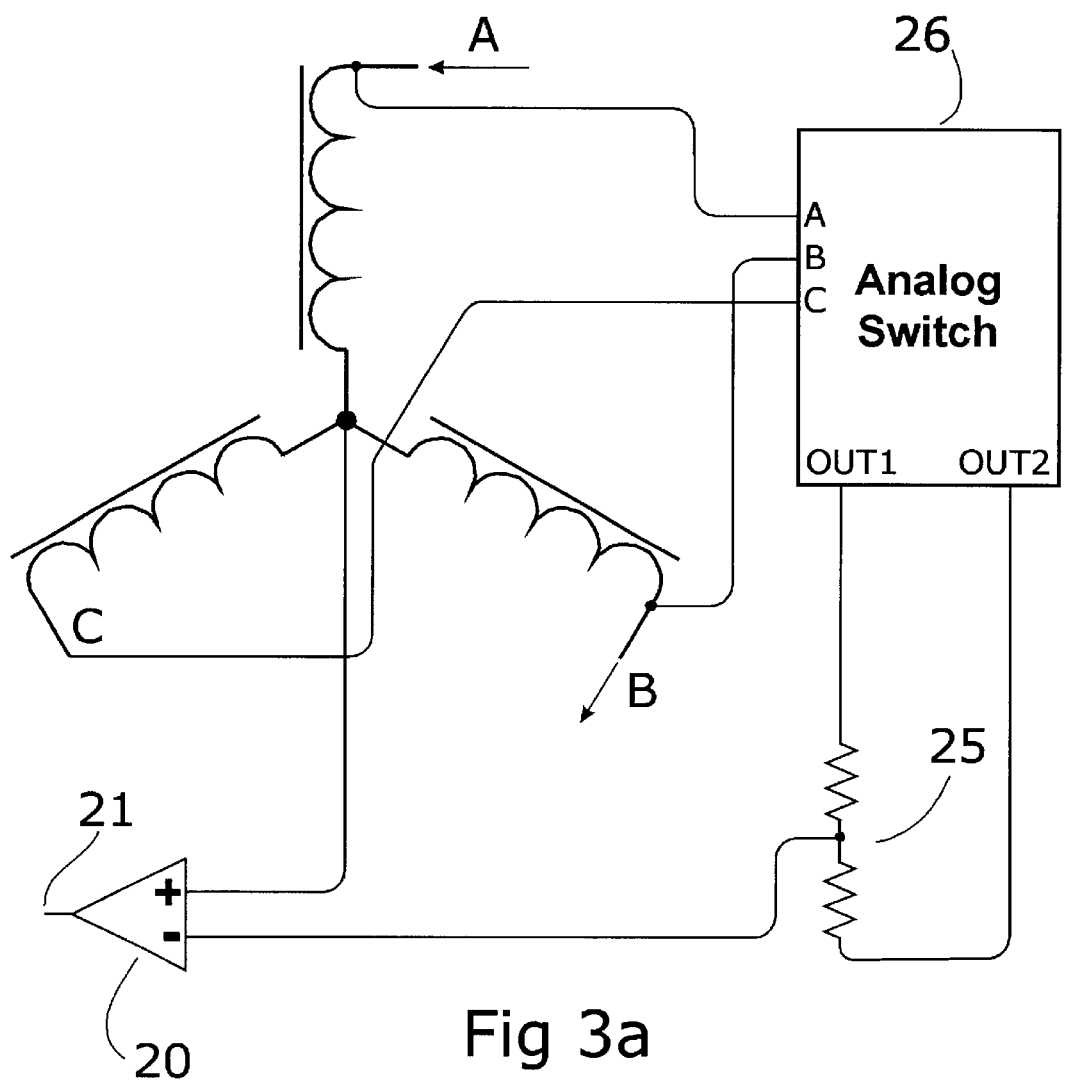
FIG. 3a is a schematic of the sensing circuit including the analog switch and reference network in one possible configuration of the present invention.
Figure 3B:
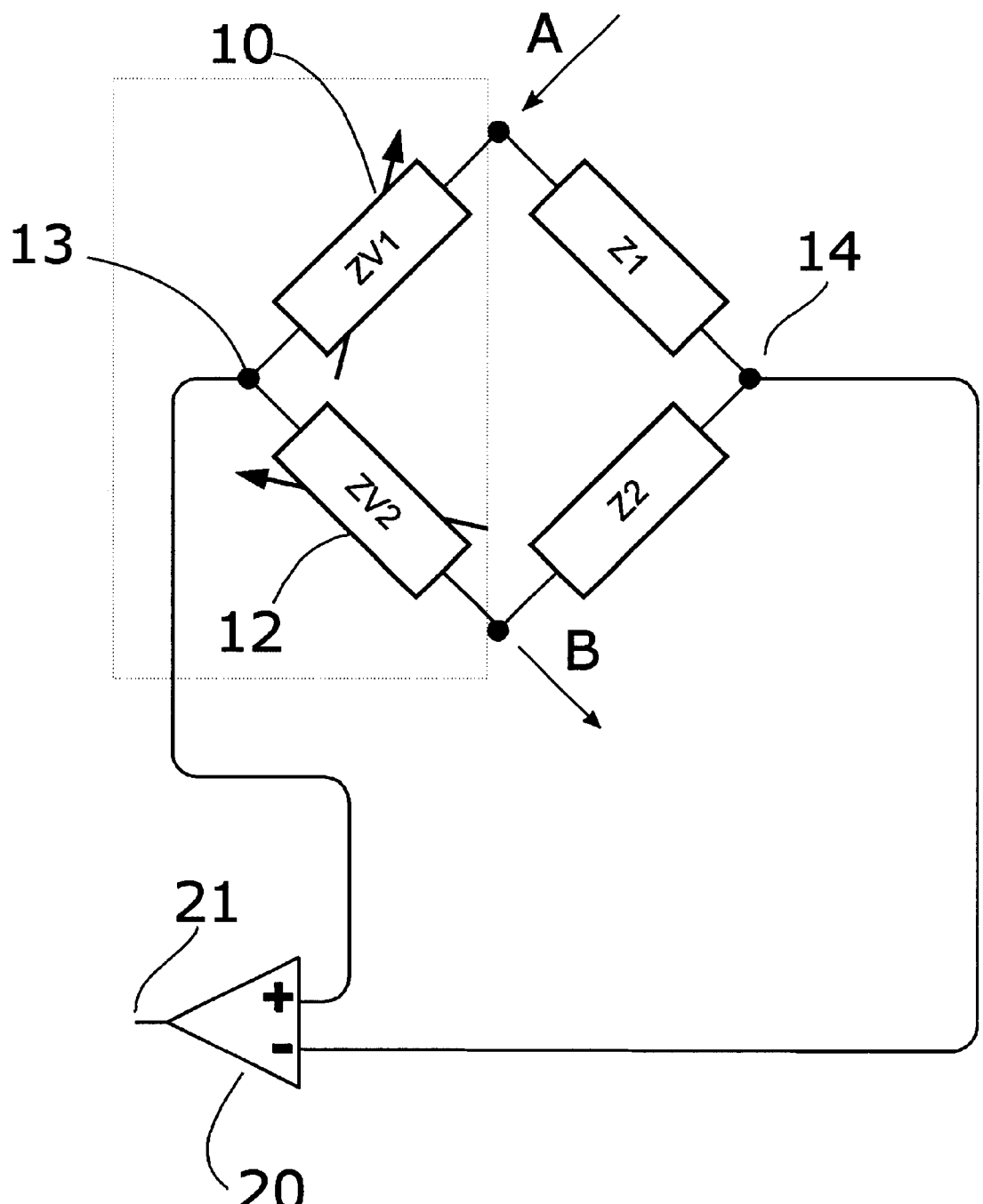
FIG. 3b is a schematic diagram showing a detailed view of the sensing circuit
Figure 3C:
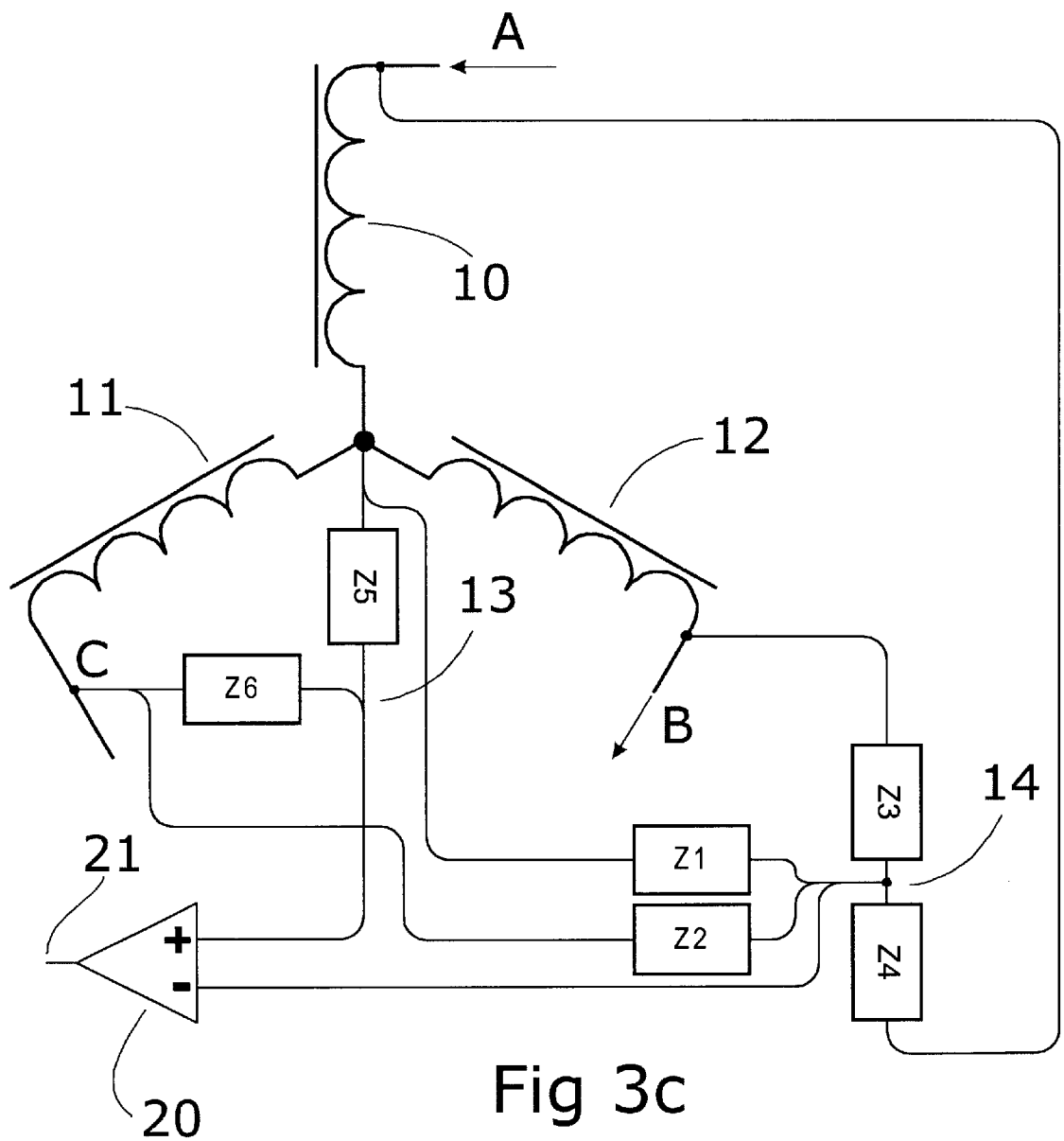
FIG. 3c is a schematic diagram showing a more complex variant of the motor and sensing circuit

FIGS. 3 and 3b depict the simplest example of a fixed-impedance reference network; more complex configurations may be used to compensate for additional error sources, as shown in FIG. 3c. In some cases it is desirable to attach the end of un-driven winding 11 at node C into the variable impedance side of the bridge amplifier via Z6, this is particularly useful to cancel out back-EMF voltage components. The fixed impedance reference network Z1, Z2, Z3, and Z4 may also benefit from connections to the other motor nodes besides the driven winding. All of the impedances shown in FIG. 3c may be any type of impedance including resistors, inductors, capacitors, or non-linear elements such as switches; the exact details depend on the characteristics of the motor and the nature of the required compensation.

In FIG. 3c, differential amplifier 20 measures the voltage differential between nodes 13 and 14. The amplifier's output signal 21 corresponds to the ratio of impedance between the legs of windings 10, 12 being driven. This ratiometric measurement, resulting in output voltage signal 21, compensates for many factors that change the absolute impedance measurement of the motor windings, and prevent those factors from disturbing the position measurement.

The diagrams of FIGS. 3, 3b, and 3c are simplified in that they show only enough circuitry to sense for phase windings 10 and 12 when driven at nodes A and B. A motor commutation system (not shown) switches the current drive between windings, and the sense circuit must also be switched correspondingly.

FIG. 3a shows the sensing circuit including switch block 26 and reference network 25 in one possible configuration of the present invention. Switch block 26 connects sequentially two of the three external nodes A, B, C to the reference network 25. Switch block 26 is controlled by the commutation control mechanism so that its state always matches the motor commutation.

Figure 4:
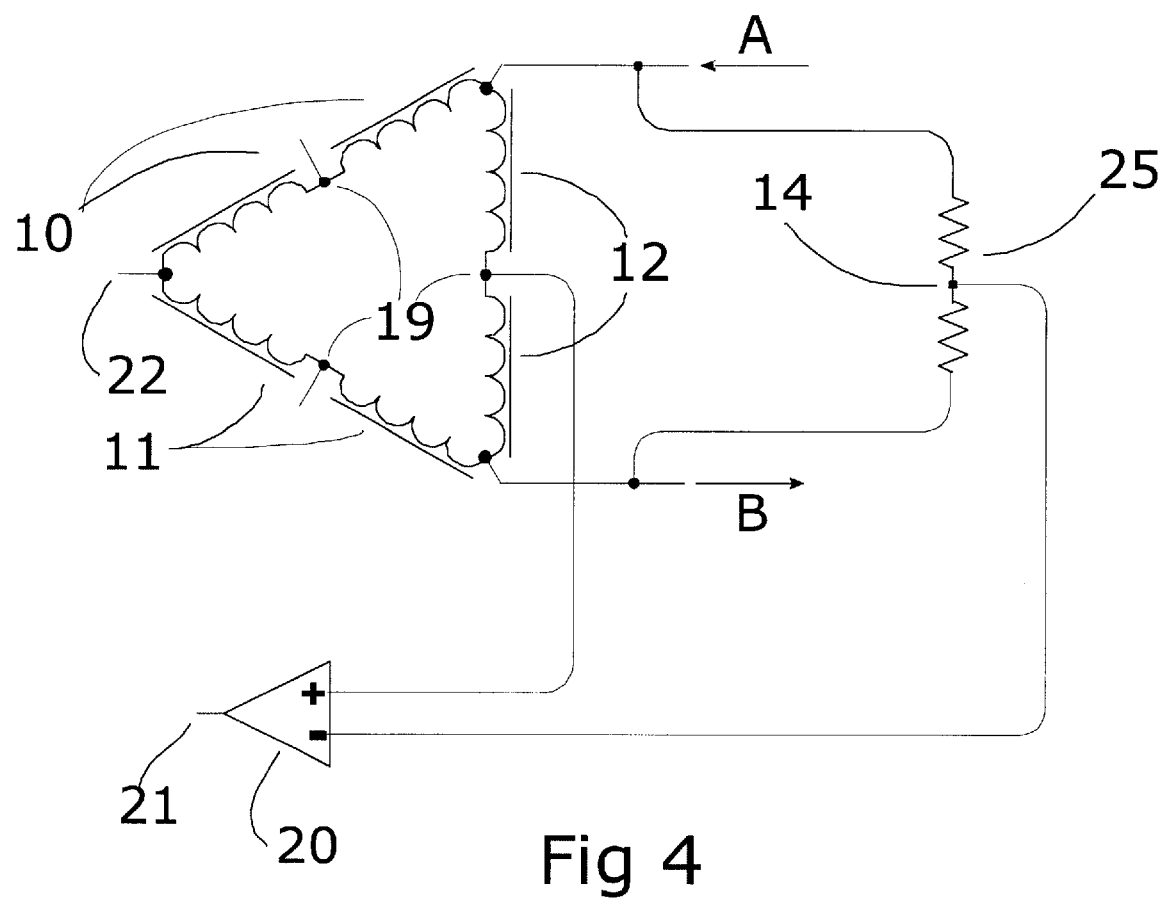
FIG. 4 is a schematic diagram of an alternate configuration of the present invention depicting delta-connected windings with a motor and sensing position circuit.

FIG. 4 is a schematic diagram of an alternate configuration of the present invention depicting delta-connected windings 10, 11, 12 with a motor and sensing position circuit. Center-taps 19 are placed into each of windings 10, 11, 12 of a 3-phase delta-connected motor, dividing each winding into two sections. It should be noted that center-taps could also be used in a wye-connected motor configuration (FIG. 3). Winding 12 is driven with a current (in direction node A to node B), to generate motor torque. Center tap 19 and center node 14 of a fixed-impedance reference network 25 are inputted to bridge amplifier 20 and thus used to generate output voltage signal 21, the sense voltage. External motor winding node 22 is not driven. The circuit is otherwise similar to that shown in FIG. 3.

The resulting output voltage signal 21 of FIGS. 3, 3a, 3b, 3c, 4 varies in a consistent way with motor position. The particular bridge amplifier output pattern is dependent on the characteristics of the motor itself.

Figure 5:
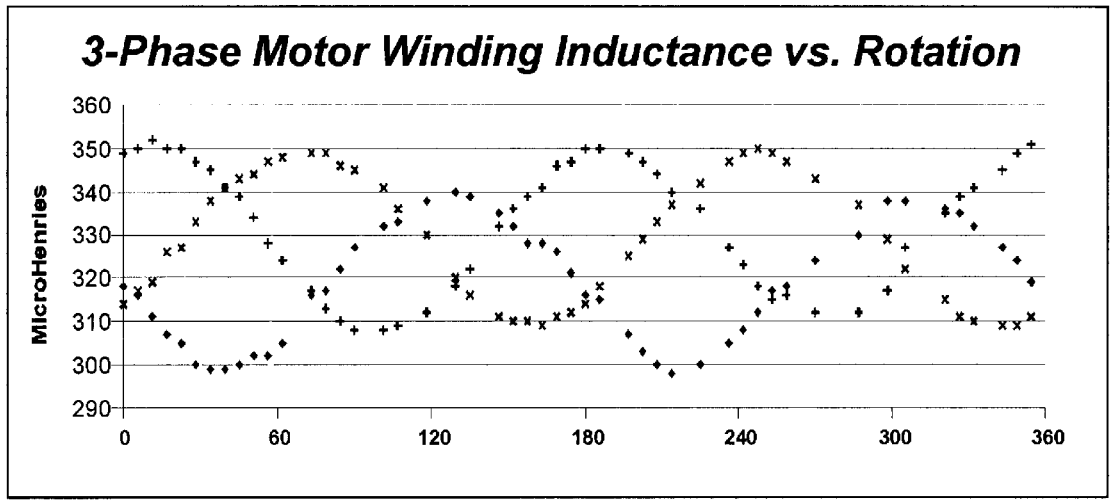
FIG. 5 is a graph showing measured impedance-ratio sense voltages for a typical motor.

FIG. 5 is a graph showing measured impedance-ratio output sense voltages for typical motor winding impedances. During motor operation, the motor drivers are switched so that different winding pairs are driven; this is the process of commutation as previously described. As the windings are switched, the position-sense measurement is also switched from winding to winding. Therefore, we will never see the complete waveforms as shown in FIG. 5 but only the parts that are used during normal motor operation.

Figure 6:
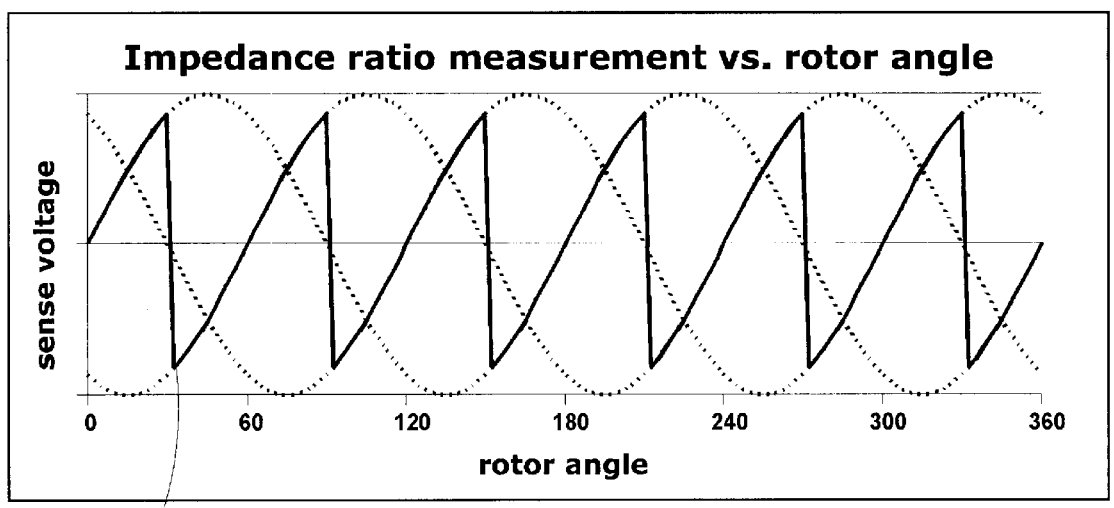
FIG. 6 is a graph of the output sense voltage showing the effects of the commutation on the impedance-ratio sense voltage.

FIG. 6 is a graph of the output sense voltage showing the effects of commutation on the impedance-ratio sense voltage. Sense voltage signal line 30 represents the actual signal after switching. When the sense voltage approaches preselected thresholds, commutation logic will switch to the next phase and the sense outputs will also switch accordingly. A particular voltage along the signal curve 30 represents a particular rotational position of the rotor, so appropriate signal processing of voltage 30 can determine the rotor position as precisely as needed. Monitoring the position changes over time also give measurements of rotational speed. These speed and position signals are available as outputs, to be used by external servo, control, and monitoring functions.

The sense output does not distinguish between the presence of a North pole or a South pole, so it repeats its waveform for both types of poles. This means that the waveform is repeated twice every full electrical cycle (every 180 electrical degrees of motion). This gives an ambiguity in the position output. This ambiguity can be resolved by initializing the sense circuitry using another position sensing technique. Such other position sensing techniques provide for a redundant system which may resolve any ambiguities. The initialization need be done only once after power-up, to resolve the ambiguity and thenceforth the impedance ratio sensing can track the position correctly. Possible techniques for initialization might include the use of any of the described prior art, or might include driving the motor blindly (without position feedback) to move it to a known position. Thus, the use of such conventional methods in conjunction with the winding impedance measurement of the present invention provides a means for verifying the motor positioning sensed by the present invention and resolving ambiguity.

The impedance-ratio sensing of the present invention is based on current through the driven winding so it can only function when current is flowing through the motor. When the motor is off, a small "trickle" current must be fed through the motor to maintain position sensing and tracking. Experiments have shown that very small currents, that are too small to cause any motor motion, are still sufficient for the position sensing.

EXAMPLE EMBODIMENT OF THE PRESENT INVENTION

Figure 7:
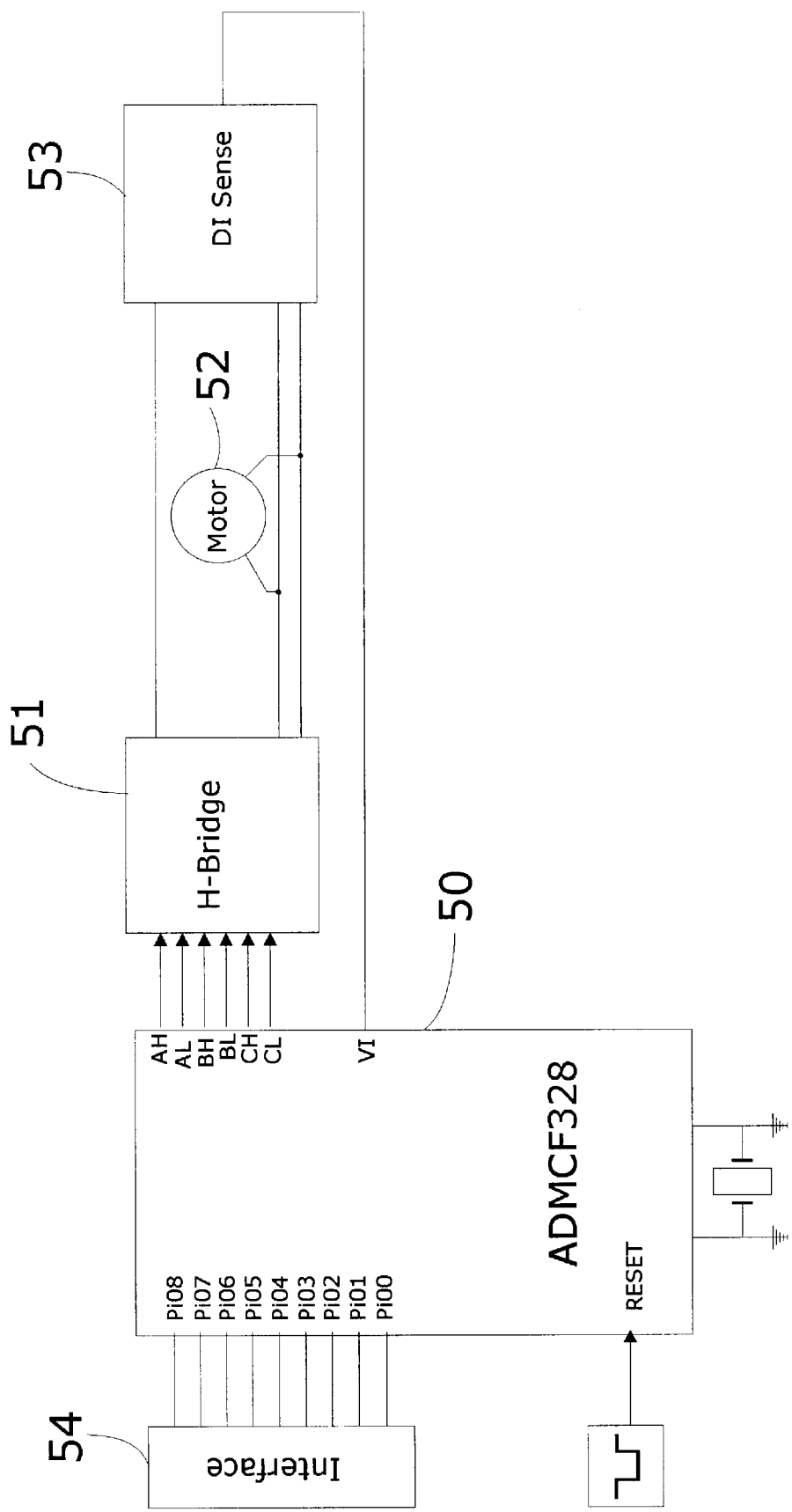
FIG. 7 is a schematic block diagram for one example embodiment of the present invention.

FIG. 7 is a schematic block diagram for one example embodiment of the present invention. The following description of an embodiment of the present invention is given only as an example. Many other embodiments (not shown) that are within the scope of the present invention are possible. The present invention is therefore not limited by the description of the following embodiment, but only by its claims.

The implementation as shown in FIG. 7 is based around Analog Devices ADMCF328 digital signal processor 50. Digital signal processor 50 is a device specifically intended for use as a motor controller, and contains motor commutation and Pulse-Width Modulation (PWM) control that is used as intended by its design. The AH, AL, BH, BL, CH, and CL outputs control H-Bridge power driver 51, which switches drive current into windings of the motor 52. Software in digital signal processor 50 determines which windings should be driven, as appropriate commutation for the instantaneous rotor position.

Digital signal processor 50 contains Pulse-Width Modulation (PWM) circuitry to allow motor winding current to be accurately controlled. The PWM circuits are, in turn, commanded by software, which determines appropriate winding current values depending on motor torque/speed output requirements.

To sense rotor-position, additional analog inputs available on the digital signal processor 50 are used. DI Sense block 53 contains a sense circuit similar to that shown in FIG. 3 along with switching circuitry to dynamically connect the sense circuit to the respective un-driven winding. DI Sense block 53 output is similar to the output graph of FIG. 6, and is fed to an analog input V1 on digital signal processor 50. The analog sampling of the V1 input is synchronized with the PWM drive cycle that drives the motor windings to distinguish the PWM AC component from the low-frequency component and thus distinguish resistance changes from inductance changes.

Inside the ADMCF328, digital signal processor 50 the DI sense block 53 output voltage is converted to a digital value. Software routines process the digital value using known motor impedance curves to calculate and track the rotor position. The calculated motor position is fed back into the commutation software. In addition, timing of changes in motor position can be used to measure rotational speed. Both position and speed may need to be controlled or monitored depending on the system requirements for motor performance. It should be noted that FIG. 7 is depicted as a block diagram and thus not all circuit connections are necessarily shown.

Figure 1:
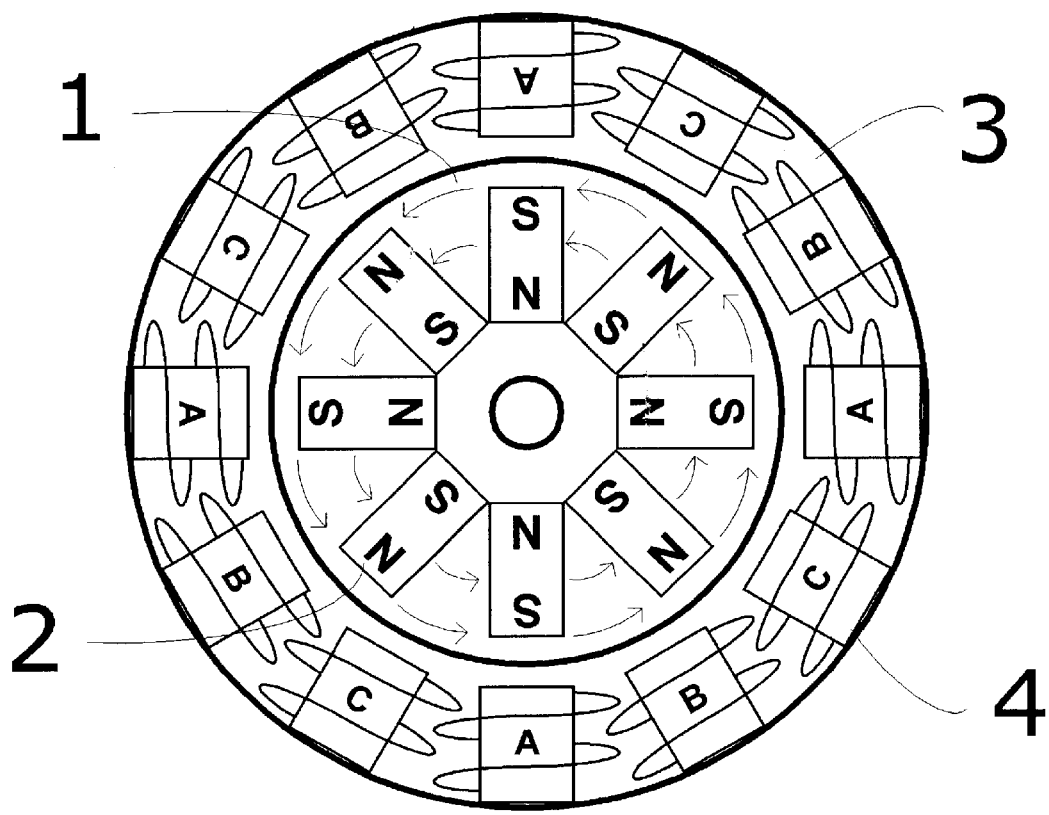
FIG. 1 is an illustration of prior art showing one type of electric motor. (previously described)
Figure 1A:
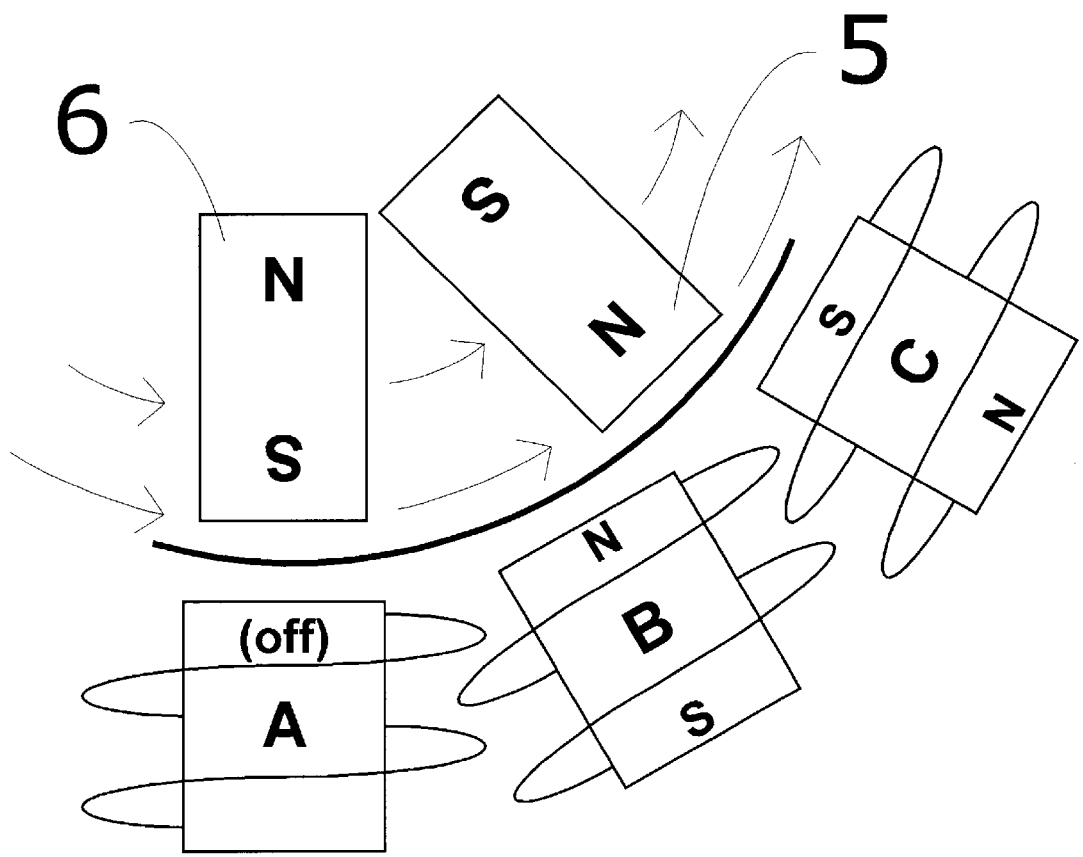
FIG. 1a depicts one section of the electric motor of FIG. 1 showing parts of the stator and rotor. (previously described)
Figure 1B:
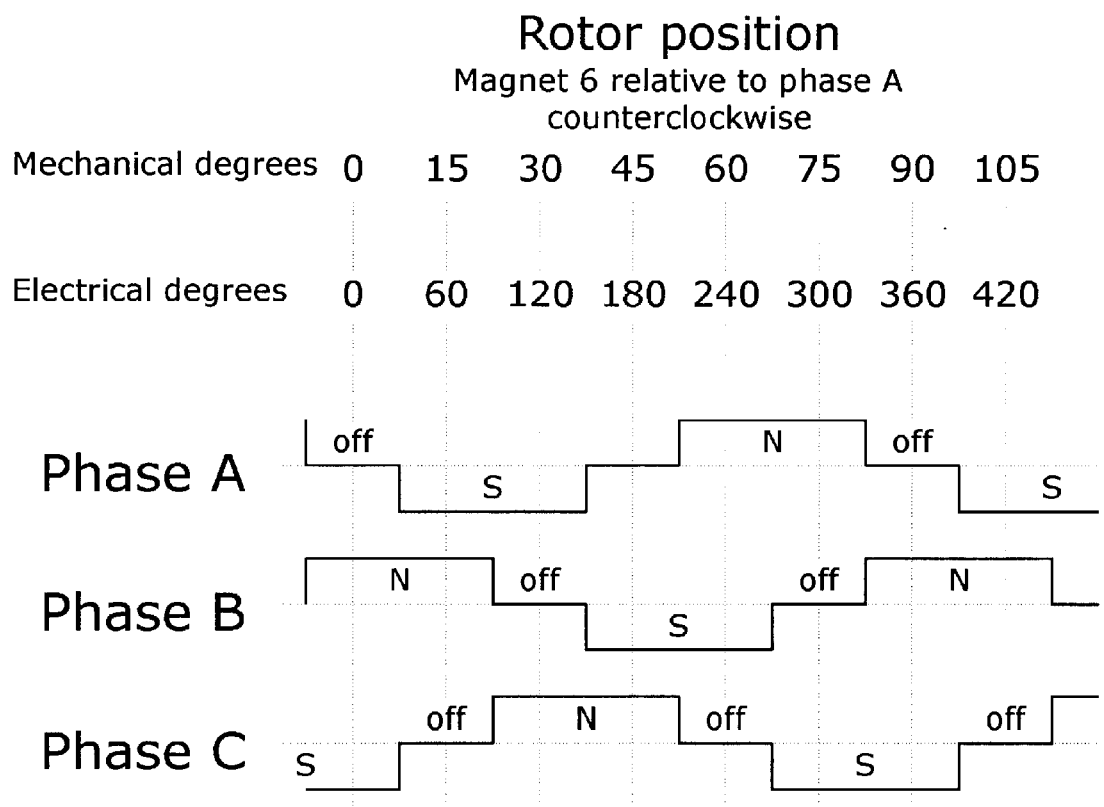
FIG. 1b illustrates the commutation sequence for the example of FIG. 1a above. (previously described)
Figure 1C:
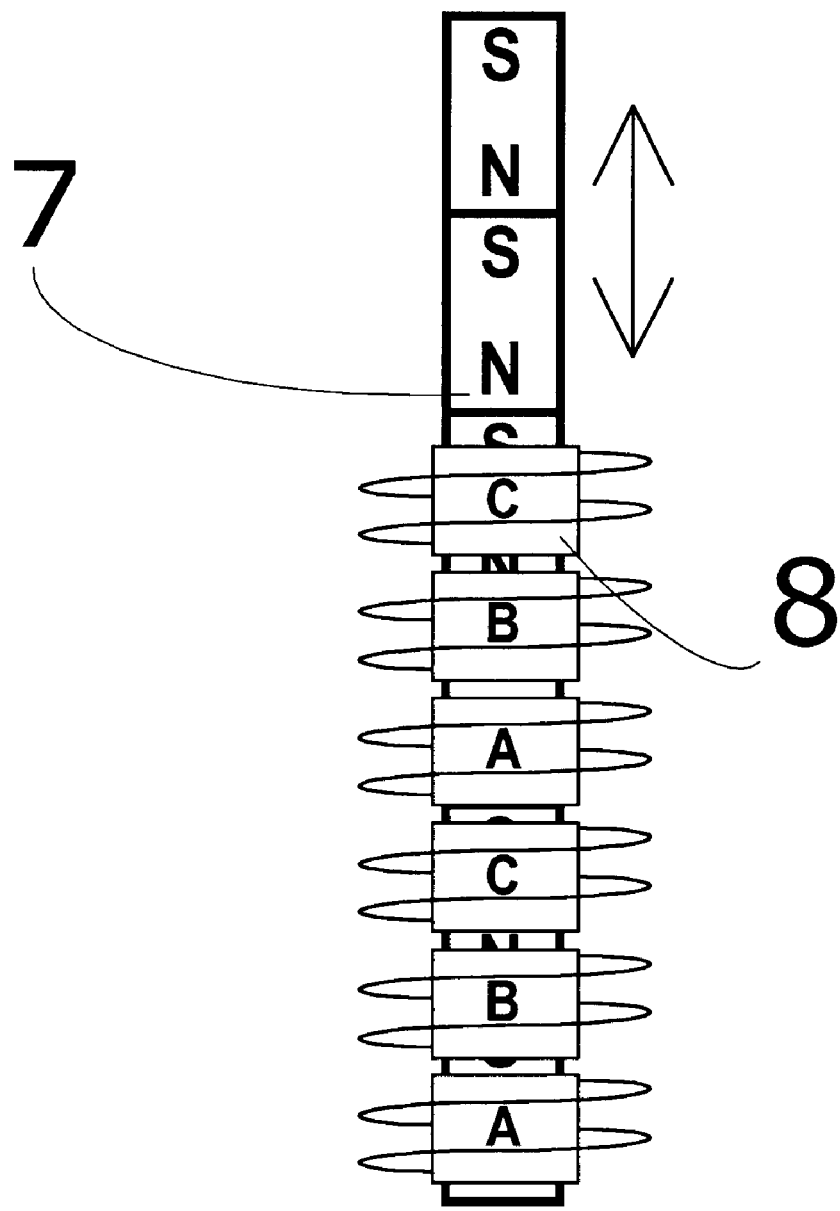
FIG. 1c depicts a linear motor. (previously described)
Figure 2:
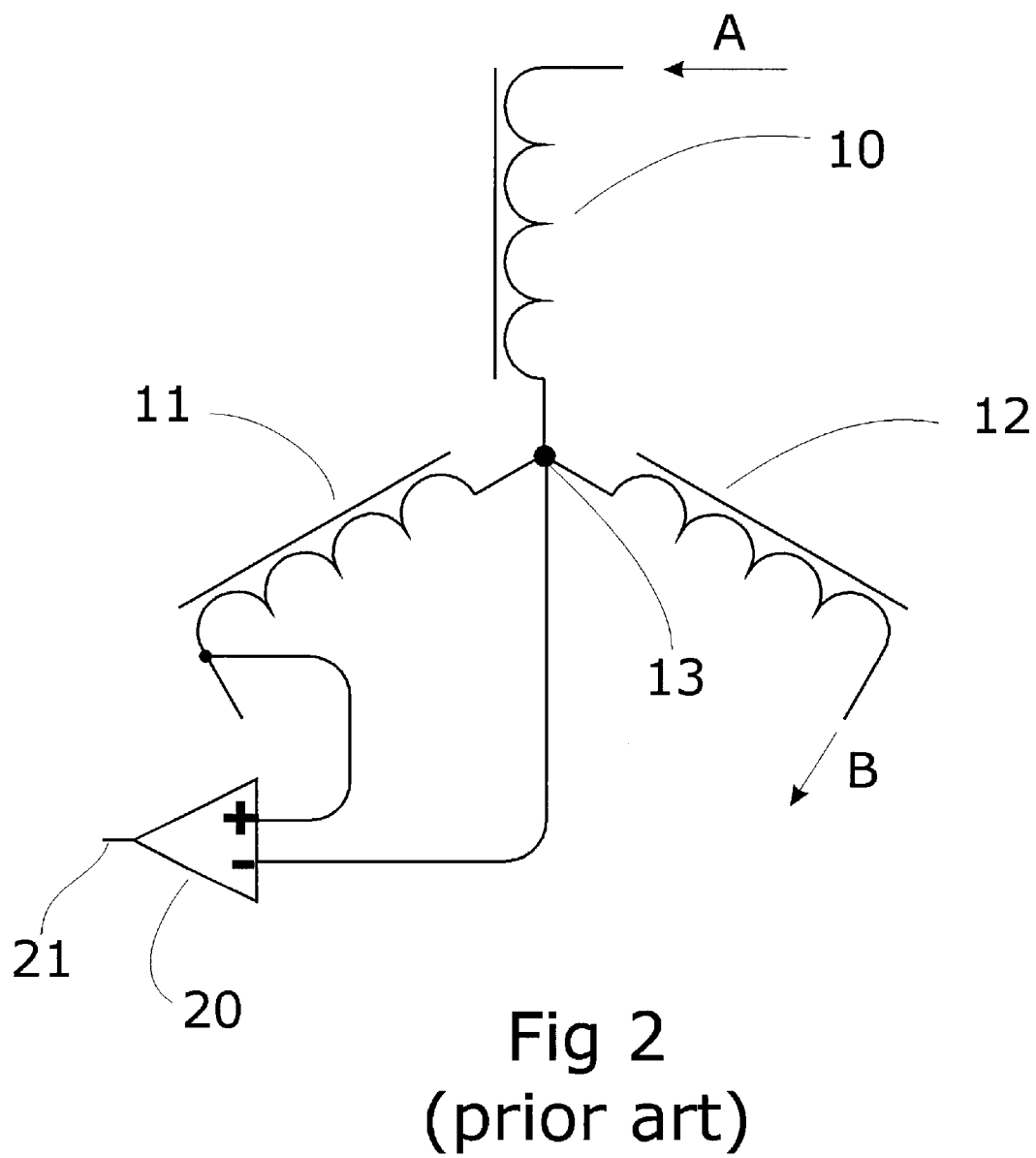
FIG. 2 is a schematic diagram of a prior art method that uses back-EMF to sense the motor speed. (previously described)

Optionally, the DI sense block 53 could also contain back-EMF sensing circuitry similar to that shown in FIG. 2, along with appropriate switching with that output fed to another ADMCF328 digital signal processor analog input. This would allow the ADMCF328 digital signal processor to read back-EMF position information to supplement or verify the DI sense voltage. Thus, back-EMF can be used to detect the position of the motor in order to provide another method for measuring and for verifying a motor position sensed by the improved rotor position detector.

The ADMCF328 digital signal processor software must operate in real time, sampling the analog inputs and updating commutation and PWM control logic as rapidly as possible. The speed of this processing cycle will limit the top usable motor rotational speed in RPM.

Digital signal processor 50 is interfaced to a master system processor or computer (not shown) though logical interface link 54. The master system processor can command specific motor RPM or position as needed by the system, and digital signal processor 50 can report speed, position, current, etc. information to the master system processor. In this way, digital signal processor 50 software is responsible only for running the motor and will not be required to handle any other system activity.

Although the present invention has been described with reference to preferred embodiments, numerous modifications and variations can be made and still the result will come within the scope of the invention. No limitation with respect to the specific embodiments disclosed herein is intended or should be inferred.

I claim:

1. In a DC electric motor with a drive current being rotated in sequence through electromagnets on a rotor or a stator thereby generating a rotating magnetic field, said drive current at any instant flowing through a plurality of electromagnets operating in series, an improved rotor position detector comprising:

a fixed impedance reference network comprising two components connected in series, each component having an impedance not affected by motor rotation;

said components being connected in parallel to a plurality of driven electromagnets;

the fixed impedance reference network and the driven electromagnets forming a bridge impedance network;

a computational circuit having a first input connected to a node between the driven electromagnets, and having a second input connected to a node between the components of said fixed impedance reference network;

wherein an output signal of the computational circuit is consistently related to an impedance ratio between the driven electromagnets;

said impedance ratio depending on a relative rotational position between the rotor and the stator, thereby defining a rotor position relative to the stator.

2. The apparatus of claim 1 further comprising one or more position sensors attached to the motor, said sensors measuring a starting or a low-resolution position, thereby providing means functioning to verify a rotor position sensed by said improved rotor position detector and to resolve ambiguities.

3. The apparatus of claim 1 further comprising means for sensing an instantaneous Back-EMF from one or more undriven winding legs of a multi-phase motor functioning to provide a method of supplementing a rotor position and/or speed measurement under varying conditions as sensed by said improved rotor position detector.

4. The position detector of claim 1 further comprising a switch that connects the motor electromagnets to the fixed impedance reference network, whereby at any instant the switch connects the fixed reference network in parallel with the driven motor electromagnets.

5. The apparatus of claim 1 further comprising an electronic signal processor using as its input the output signal of said computational circuit, and generating as its output a measurement of the relative position between rotor and stator.

6. The apparatus of claim 5, wherein the electronic signal processor generates absolute position information, where the absolute position information is used to control switches for motor commutation.

7. The apparatus of claim 5, wherein the electronic signal processor generates position information, where the position information is used to control current waveform generation for sinusoidal or other arbitrary motor-drive waveforms, where the waveform advances according to motor position and speed.

8. The apparatus of claim 5, wherein the electronic signal processor generates velocity information, where the velocity information is used as feedback to a servo controller.

9. The apparatus of claim 5, wherein the electronic signal processor generates position information, where the position information is used as feedback to a servo controller.

10. In a DC electric motor with drive current being rotated in sequence through electromagnets on a rotor or a stator thereby generating a rotating magnetic field, said drive current at any instant flowing through a plurality of electromagnets operating in series, an improved rotor position detector comprising:

a fixed impedance reference network comprising two components connected in series, each component having an impedance not affected by motor rotation;

said components being connected in parallel to a plurality of electromagnets;

the fixed impedance reference network and the driven electromagnets forming a bridge impedance network;

a differential amplifier having two inputs where one input is connected to an undriven winding, and the other input is connected to a node between the fixed impedance components of said fixed impedance reference network;

wherein an output signal of the differential amplifier is consistently related to an impedance ratio between the driven electromagnets;

said impedance ratio depending on a relative rotational position between the rotor and the stator, thereby defining a rotor position relative to the stator.

11. The apparatus of claim 10 further comprising one or more position sensors attached to the motor, said sensors measuring a starting or a low-resolution position, thereby providing means functioning to verify a rotor position sensed by said improved rotor position detector and to resolve ambiguities.

12. The apparatus of claim 10 further comprising means for sensing an instantaneous Back-EMF from one or more undriven winding legs of a multi-phase motor, thereby providing a method of supplementing a rotor position and/or speed measurement under varying conditions as sensed by said improved rotor position detector.

13. The position detector of claim 10 further comprising a switch that connects the motor electromagnets to the fixed impedance reference network, whereby at any instant the switch connects the fixed reference network in parallel with the driven motor electromagnets.

14. The apparatus of claim 10 further comprising an electronic signal processor using as its input the output signal of the differential amplifier, and generating as its output a measurement of the relative position between rotor and stator.

15. The apparatus of claim 14, wherein the electronic signal processor generates absolute position information, where the absolute position information is used to control switches for motor commutation.

16. The apparatus of claim 14, wherein the electronic signal processor generates position information, where the position information is used to control current waveform generation for sinusoidal or other arbitrary motor-drive waveforms, where the waveform advances according to motor position and speed.

17. The apparatus of claim 14, wherein the electronic signal processor generates velocity information, where the velocity information is used as feedback to a servo controller.

18. The apparatus of claim 14, wherein the electronic signal processor generates position information, where the position information is used as feedback to a servo controller.

19. In a DC electric motor with drive current being rotated in sequence through electromagnets on a rotor or a stator thereby generating a rotating magnetic field, said drive current at any instant flowing through a plurality of electromagnets connected in a delta configuration, with a center tap in each of the electromagnets, said center tap dividing the winding of each electromagnet into two sections, an improved rotor position detector comprising:

a fixed impedance reference network comprising two components connected in series, each component having an impedance not affected by motor rotation;

said components being connected in parallel to a plurality of electromagnets;

the fixed impedance reference network and the driven electromagnets forming a bridge impedance network;

a differential amplifier having two inputs where one input is connected to a center tap in a driven electromagnet, and the other input is connected to a node between the fixed impedance components of said fixed impedance reference network;

wherein an output signal of the differential amplifier is consistently related to an impedance ratio between the two sections of the driven electromagnet;

said impedance ratio depending on a relative rotational position between the rotor and the stator, thereby defining a rotor position relative to the stator.

20. The apparatus of claim 19 further comprising one or more position sensors attached to the motor, using the sensors to measure a starting or a low-resolution position, thereby providing means functioning to verify a rotor position sensed by said improved rotor position detector and to resolve ambiguities.

21. The apparatus of claim 19 further comprising means for sensing an instantaneous Back-EMF from one or more undriven winding legs of a multi-phase motor, thereby providing a method of supplementing a rotor position and/or speed measurement under varying conditions as sensed by said improved rotor position detector.

22. The position detector of claim 19 further comprising a switch that connects the motor electromagnets to the fixed impedance reference network, whereby at any instant the switch connects the fixed reference network in parallel with the driven motor electromagnets.

23. The apparatus of claim 19 further comprising an electronic signal processor using as its input the output signal of the differential amplifier, and generating as its output a measurement of the relative position between rotor and stator.

24. The apparatus of claim 23, wherein the electronic signal processor generates absolute position information, where the absolute position information is used to control switches for motor commutation.

25. The apparatus of claim 23, wherein the electronic signal processor generates position information, where the position information is used to control current waveform generation for sinusoidal or other arbitrary motor-drive waveforms, where the waveform advances according to motor position and speed.

26. The apparatus of claim 23, wherein the electronic signal processor generates velocity information, where the velocity information is used as feedback to a servo controller.

27. The apparatus of claim 23, wherein the electronic signal processor generates position information, where the position information is used as feedback to a servo controller.

28. An apparatus to detect a position of a rotor, said apparatus comprising:

a first driven winding and a second driven winding on a rotor or a stator;

a fixed impedance reference network connected in parallel to the first and second driven windings;

a computational circuit connected to the first and second driven windings and to the fixed impedance reference network; and wherein the computational circuit detects changes in the ratio of the impedances of the first and second driven windings and the fixed impedance reference network, thereby determining a position of the rotor relative to the stator.

* * * * *